United States Patent
Rao

(10) Patent No.: US 8,423,409 B2
(45) Date of Patent: Apr. 16, 2013

(54) SYSTEM AND METHOD FOR MONETIZING USER-GENERATED WEB CONTENT

(75) Inventor: Supreeth Hosur Nagesh Rao, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 443 days.

(21) Appl. No.: 12/874,543

(22) Filed: Sep. 2, 2010

(65) Prior Publication Data

US 2012/0059722 A1 Mar. 8, 2012

(51) Int. Cl.
*G06Q 30/00* (2006.01)
*G06Q 99/00* (2006.01)

(52) U.S. Cl.
USPC .......................................... 705/14.5; 705/319

(58) Field of Classification Search ................. 705/14.5, 705/319; 379/114.13; 709/206, 224
See application file for complete search history.

(56) References Cited

U.S. PATENT DOCUMENTS

| | | | |
|---|---|---|---|
| 8,306,922 B1 * | 11/2012 | Kunal et al. .................... | 705/319 |
| 2009/0132341 A1 * | 5/2009 | Klinger et al. ................... | 705/10 |
| 2011/0225048 A1 * | 9/2011 | Nair ............................ | 705/14.66 |

OTHER PUBLICATIONS

"The BBS Corner", downloaded Jan. 13, 2013 from http://www.bbscorner.com/.*
Editorial, "A call for 'User-Generated Branding'", Journal of Brand Management (2010) 18, 1-4. doi: 10.1057/bm.2010.30.*
Twitter blog, "Hello World", Apr. 13, 2010, downloaded Jan. 12, 2013 from http://blog.twitter.com/2010/04/hello-world.html.*
http://adcause.com/static/publisher, adCause, p. 1, Copyright, 2009.
http://www.facebook.com/advertising/, Facebook (2) Advertising, p. 1, Copyright 2010.
http://izea.com/publishers/, Publishers IZEA, p. 2.1-2, Copyright, 2010.
http://izea.com/advertisers/social-media-sponsorship/about-sms/, pp. 1-3 Copyright, 2010.
http://www.businessinsider.com/how-will-twitter-make-money-make-you-love-it-2009-11, pp. 1-2, Nov. 20, 2009.

* cited by examiner

*Primary Examiner* — Donald L. Champagne
(74) *Attorney, Agent, or Firm* — Brinks Hofer Gilson & Lione

(57) ABSTRACT

A system and method for monetizing user-generated web content are provided. The system includes a tracking engine operable to track user activity taking place a plurality of social networks. The tracking engine is in communication with an branding engine, which is notified when a user publishes content on a social network. The ad branding engine is configured to analyze user-published content and select at least one advertisement contextually related thereto. The ad branding engine incorporates the advertisement with the user-published content, and in turn, the user is compensated.

21 Claims, 5 Drawing Sheets

SYSTEM AND METHOD FOR MONETIZING USER-GENERATED WEB CONTENT

SUMMARY

The present application provides a system and method for dynamically monetizing user-generated web content web content. The system comprises a tracking engine for monitoring user activity on one or more social networks. The tracking engine is operatively coupled to an ad branding engine, which is configured to incorporate advertisements along with user-generated content. Upon detecting that a user has published content on a social network, the tracking engine notifies the ad branding engine of the activity. The ad branding engine analyzes the content and selects an advertisement contextually related thereto. After the ad branding engine incorporates the selected advertisement with the user-generated content, the user is compensated.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

The drawings described herein are for illustration purposes only and are not intended to limit the scope of the present disclosure in any way.

It should be understood that throughout the drawings, corresponding reference numerals indicate like or corresponding parts and features.

DETAILED DESCRIPTION

With the advent of the Internet, Internet-based advertising has become increasingly popular among advertisers for promoting products and services. Advertisements may comprise banner ads, links to web pages, images, audio, text, and/or video, animations, two- and three-dimensional objects, etc. The various advertisements used to promote products on the Internet may be displayed according to a variety of formats, such as in conjunction with a ranked result set in response to a query, embedded in a web page, a pop-up, etc.

In recent years, social networking services have also become increasingly popular. Such services provide various platforms for online users to interact. Social networking sites such as FACEBOOK and MYSPACE, for instance, enable users to add people as "friends" (connections), send messages to friends, and update their personal profiles to notify friends about themselves. Another popular social networking and micro-blogging site known as TWITTER enables users to send and read other user messages called "tweets." Tweets are short text-based posts displayed on the author's homepage, as well on the homepage of users "following" the author.

In light of the rapidly growing popularity of online social networks, advertisers have been developing various techniques to target these services. For instance, some advertisers display banner ads to FACEBOOK and MYSPACE users when viewing their profile pages or when viewing the profile pages of their linked friends. In addition, an advertising network known as Sponsored Tweets enables users to monetize their "tweets." More specifically, advertisers compensate "tweeters" (TWITTER users that post messages) for promoting their product, service, or site by way of a tweet.

While numerous advertising schemes exist, the amount of revenue generated is not commensurate with the amount of user attention, page views, and traffic flow that social networking websites have managed to attract. FACEBOOK, for example, is presently the most used social network by worldwide monthly active users, yet the click-through rate for advertisements displayed on FACEBOOK is generally lower than most major websites. Social networks are primarily driven by the interaction that occurs among the users, and conventional methods neglect this interaction. Accordingly, the present application proposes an advertising system and a methodology that focuses on user interaction in social networks.

Figure 1:
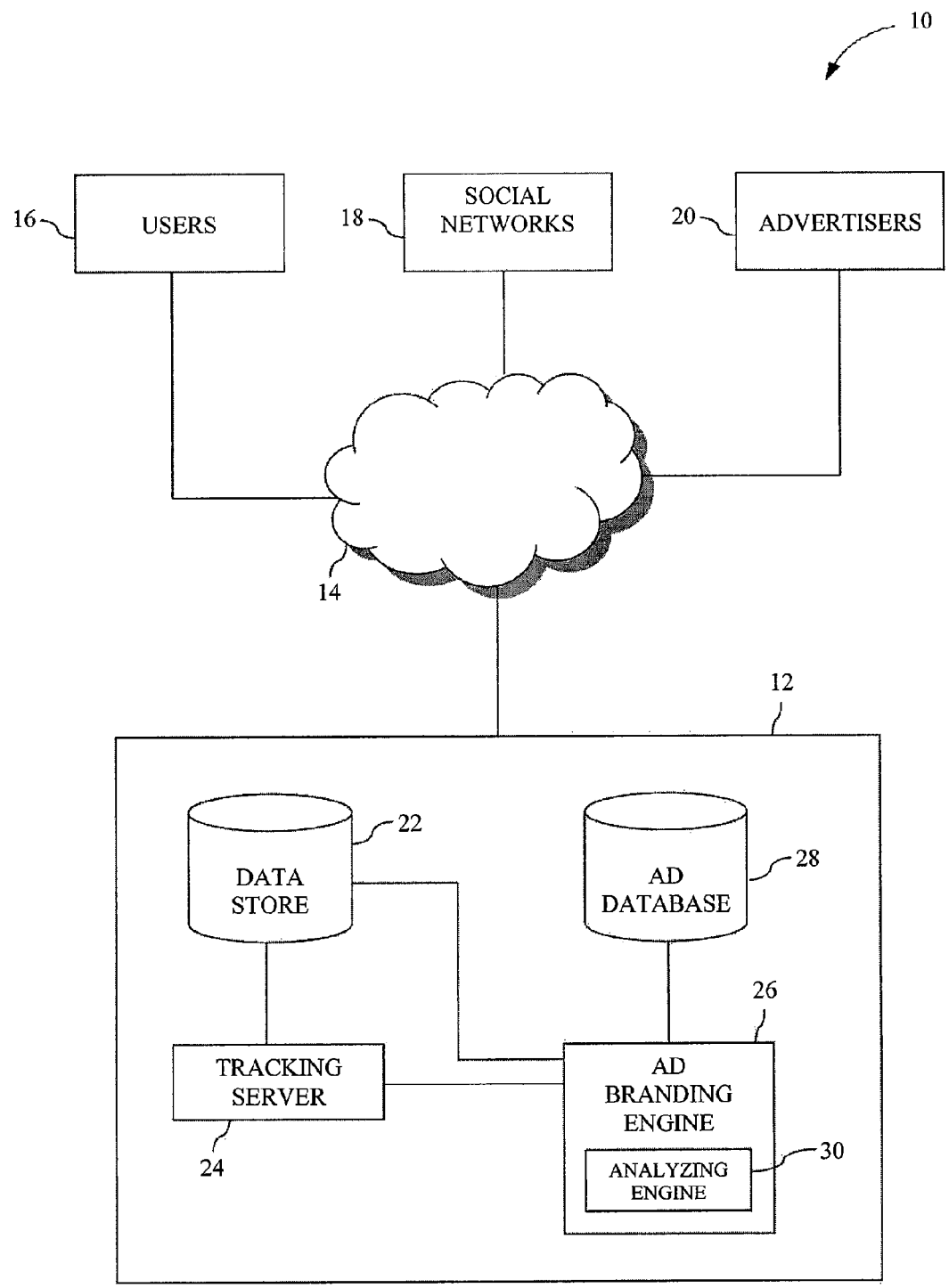
FIG. 1 is a schematic view of a system for monetizing user-generated web content web content.

Referring now to FIG. 1, a system embodying the principles of the present application is illustrated therein and designated at 10. The system 10 is configured as a client-server architecture. A "client" is typically a member of a class or group that uses the services of another unrelated class or group. In the context of a computer network, such as the Internet, a client is a process (e.g., roughly a program or task) that requests a service provided by another process, known as a server program. The client process may generally use the requested service without having to know any working details about the other server program or the server itself.

In networked systems, a client process usually runs on a client device, e.g., a computer (or component thereof) that accesses shared network resources provided by another computer running a corresponding server process. Such client devices may include laptops, home computers, personal digital assistant (PDA) devices, mobile phones, set top boxes, game consoles, portable electronic devices, etc. As will be understood to those of ordinary skill in the art, it is possible for a client process and a server process to run on the same device.

A "server" is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The system 10 comprises a server 12 capable of being in communication with a distributed network 14, which may include a connection to one or more networks such as the Internet. Other forms of a network for communication include, but are not limited to, a local and/or wide area network, a wireless network such as a WiFi™ or WiMAX™ network, a mobile data network, or any other suitable network for communication. While only one server 12 is depicted in the drawings, those of ordinary skill in the art will appreciate that the system 10 may incorporate a plurality of servers.

Users 16, social networks 18, and advertisers 20 are communicatively linked to the server 12 via the network 14, whereby the server 12 acts to manage the entire system 10. While certain specific entities are discussed herein, it is to be understood that additional entities capable of accessing the network 14 may be similarly be connected to the server 12. In addition, for purposes of convenience, most of the examples discussed herein refer to the TWITTER network 18, yet those of ordinary skill in the art will appreciate that the present application is not so limited and may apply to any suitable social network 18.

Social networks 18 may include any Internet-based service for enabling users 16 to interact (e.g., upload and retrieve content), such as, but not limited to, TWITTER, FACEBOOK, MYSPACE, YOUTUBE, FLICKR, LINKEDIN, NING, AGGED, CLASSMATES.COM, etc. Social networks 18 also include aggregation sites that allow users 16 to receive "updates" (a stream of recent events and activities that help users stay in touch with their friends) from multiple social networks 18. YAHOO!, for example, provides a feature known as YAHOO! Updates that displays YAHOO! updates, as well as updates from other social networks 18, on a YAHOO! user's profile page. Thus, a YAHOO! user 16 that is also a member of FACEBOOK 18 and TWITTER 18 may authorize YAHOO! to publish updates generated from their FACEBOOK and/or TWITTER accounts on the YAHOO! Network 18.

In one implementation, a user 16 of a social network 18 may sign an agreement that authorizes advertisers 20 to display advertisements along with content published by the user 16 in return for some form of compensation. As will be discussed further below, users 16 may be compensated according to various payment plans. Compensation may refer to a benefit, such as money, items, services, credits or points (redeemable for money, items, services, and the like), or any other benefit provided by one entity to another. In addition, one or more entities may share in revenues realized from click-stream and/or purchase activity of a content consumer. If a user 16 accepts the terms of the agreement, the social network 18 notifies the server 12.

The server 12 includes at least one data store 22 for storing information associated with each user 16 that has authorized advertising on a particular social network 18. The data store 22 may be implemented as any type of data storage structure capable of providing for the retrieval and storage of a variety of data types. For instance, the data store 22 may comprise one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

A tracking engine 24 communicatively linked to the data store 22 uses information stored therein to identify users 16 to track on one or more social networks 18. While the data store 22 and tracking engine 24 are both shown in FIG. 1 as being incorporated with the server 12, those of ordinary skill in the art will appreciate that the data store 22 and/or tracking engine 24 may be provided as separate components, and/or may be controlled by one or more separate entities. Similarly, while only one data store 22 and tracking engine 24 are shown, it is to be understood that additional data stores and tracking engines may be provided. For instance, the server 12 may include a separate data store 22 and/or tracking engine 24 for each social network 18 in communication with the server 12.

The tracking engine 24 may be implemented in hardware, software, and/or firmware, and is configured to track user activity on a social network 18. The tracking engine 24 is communicatively linked to each social network 18 (e.g., by way of one or more application programming interface associated with the social networks 18) and may be configured to monitor user activity continuously or according to a predetermined schedule (e.g., every ten minutes, hour, etc.). For instance, a social network 18 may automatically notify the tracking engine 24 once user activity occurs on that social network 18. Alternatively, the tracking engine 24 may be configured to monitor each social network 18 directly and identify user activity itself.

To determine what a user 16 is doing, a plug-in architecture with applications such as web browsers may be employed. In addition, a tracking object associated with each user 16 of a social network 18 may be provided. A tracking object may include a component such as an applet program written in an interpretive language such as Java™. Similarly, a tracking object may include a program written in scripting language such as JavaScript™ to track and gather user activity. As will be understood to those of ordinary skill in the art, a Java applet and a JavaScript code may be used collectively to gather user data.

According to one aspect, the tracking engine 22 is operable to populate the data store 22 with information regarding users 16. User information may also be provided by the user 16 and/or the social network 18. For instance, a social network 18 such as YAHOO! may provide users 16 with an option as to whether they agree to have their YAHOO! profiles shared with third parties (e.g., the server 12, social networks 18, advertisers 20, etc.). User information may also be collected from user devices through the network 14 and/or another channel.

In addition, user information may be provided from some other network, system, or database that aggregates such data, or by any combination of the foregoing. User information may include a wide range of information, such as, but not limited to, a user's Internet Protocol (IP) address, geographic location, web viewing history or patterns, as well as other psychographic data about users 16 (which may be received from a number of different sources). Information may also be collected about a user's age, location, gender, income, education, ethnicity, product preferences, and a variety of other demographic characteristics that are useful in matching an advertisement to content published by a user 16.

In operation, the tracking engine 24 determines whether users 16 have published content on the respective social networks 18 that each user 16 has authorized to display advertisements. As used herein, the term "content" is to be broadly interpreted, and may include data such as, but not limited to, audio, image, text, video, etc. If the tracking engine 24 is monitoring user activity on a social network 18 such as TWITTER, the tracking engine 24 determines whether a user 16 (known as "Tweeters") has posted a new tweet or has "retweeted" a message (i.e., posted an original tweet published by another Tweeter 16). With more expansive social networks 18, the tracking engine 24 monitors all facets of the service that allow users 16 to publish content. In the case of a network 18 such as FACEBOOK, for example, the tracking engine 24 can detect whether a user 16 has updated their profile status message, posted a comment, written on a "wall" (section in a user's profile where others can write messages and leave "gifts" in the form small icon-like images), etc.

Upon detecting user activity on a social network 18, the tracking engine 24 communicates this information to at least one ad branding engine 26 linked thereto. For example, if the tracking engine 24 detects that a user 16 has posted content such as a new tweet on the TWITTER network 20, the tracking engine 24 notifies the ad branding engine 30 of the new tweet. The ad branding engine 26 may be implemented in hardware, software, and/or firmware, and is configured to search an advertisement database 28 and retrieve one or more advertisements (ads) to be served along with content published by users 16 on social networks 18. Analogous to the data store 22, the advertisement database 28 may be implemented as any type of data storage structure capable of providing for the retrieval and storage of a variety of data types.

The ad branding engine 26 includes an analyzing engine 30 configured to analyze user-generated content identified by the tracking engine 24 and determine the context of the content. While the ad branding engine 26 and the advertisement database 28 are shown as being incorporated with the server 12, it is to be understood that the ad branding engine 26 and/or advertisement database 28 may be provided as a separate component, and/or may be controlled by one or more separate entities (e.g., an advertising agency). Moreover, a separate ad branding engine 30 may be provided for and/or controlled by each social network 18 in communication with the server 12. Furthermore, although the analyzing engine 30 is shown as being integrated with the ad branding engine 26, the analyzing engine 30 may be a separate component and/or may be controlled by one or more separate entities. In addition, those of ordinary skill in the art will appreciate that the analyzing engine 30 may employ various techniques for analyzing and determining the context of content, such as, but not limited to, machine learning models, semantic and/or statistical based algorithms, etc.

Based on the context of the user-generated content, the ad branding engine 26 may select an advertisement from the advertisement database 28 using various algorithms and techniques known to those of ordinary skill in the art. For instance, the ad branding engine 26 may select ads based on corresponding bid amounts and/or expected revenues (e.g., expected revenue for a given advertisement may be calculated according to a historical click-through rate associated with the advertisement).

Furthermore, the ad branding engine 26 may take into account any user information stored in the data store 22 (e.g., YAHOO! user profiles). Such information may also include user settings (e.g., likes and dislikes) including preferences specified by users 16 regarding the selection of advertisements. According to one aspect, social networks 18 may provide users 16 with an option to include and exclude certain advertisements. For example, a Republican user 16 may agree to all advertisements except those promoting the Democratic Party. Similarly, a Democrat may elect to exclude all advertisements except for those pertaining to the Democratic Party.

Of course, the ad branding engine 26 can also take into account any requirements imposed by social networks 18 and/or advertisers 20. For instance, a sports-based social network 18 may only permit the display of advertisements directed to sports. Similarly, certain advertisers 20 may specify the types of users 16 they wish to target (e.g., users 16 of a certain age group, users 16 located in certain geographical areas, users 16 having certain behavioral interests, etc.).

According to one implementation, the ad branding engine 26 may apply a matching algorithm to retrieve one or more ads contextually related to the user-generated content. For instance, if the content in question is a tweet relating to McDonald's, the ad branding engine 26 may retrieve an advertisement offering a McDonald's discount. Yet if the analyzing engine 30 has concluded that the context of the message is negative, such as a tweet stating "I don't like the fries at McDonald's," the ad branding engine 26 may terminate the selection process. Similarly, if the analyzing engine 30 concludes that the context of the content is non-descriptive or vague (e.g., a tweet that simply states "Yes"), incomprehensible (e.g., muffled slang), or is otherwise inappropriate for advertising, the ad branding engine 26 may stop and await notification from the tracking engine 24 regarding a new user update.

If the ad branding engine 26 concludes that the user published content in question is appropriate for advertising, the ad branding engine 26 may select an advertisement according to any manner discussed above. Moreover, it is to be understood that the ad branding engine 26 may incorporate advertisements with content according to a variety of formats known to those of ordinary skill in the art.

Figure 2A:
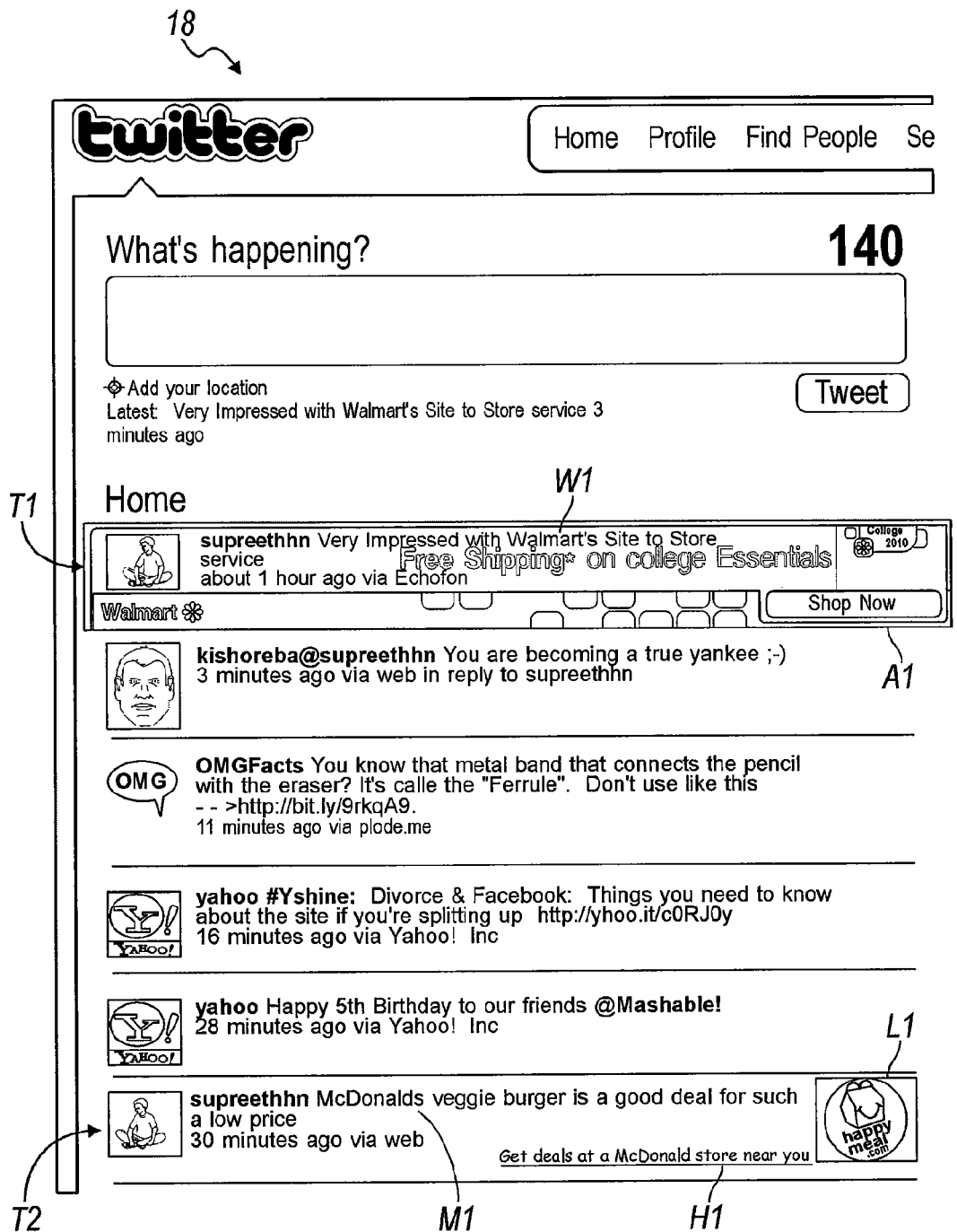
FIGS. 2A and 2B depict examples of the system and method of the present application implemented in a social network.
Figure 2B:
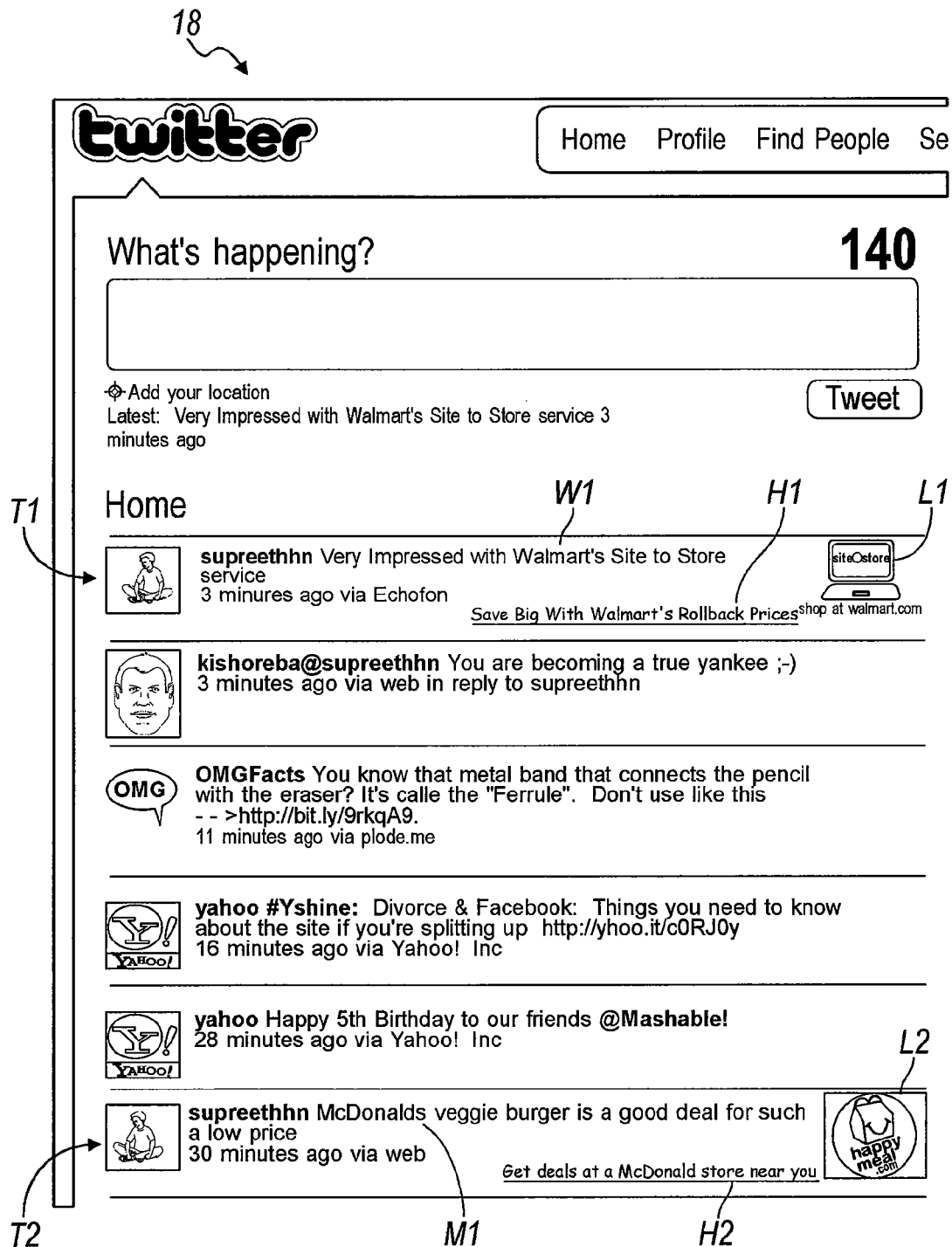

Referring now to FIGS. 2A and 2B, several examples illustrating how the system 10 of the present application may be employed with the TWITTER network 20. As shown in FIG. 2A, if a user 16 posts a tweet T1 on the TWITTER network 20 pertaining to Wal-Mart W1, the ad branding 26 engine may simply embed an advertisement A1 into the background of the content area so as to form a branded or sponsored message. The advertisement A1 may simply be a non-clickable advertisement containing information related to Wal-Mart Stores, Inc., or the background of the tweet T1 may be coded in HTML so that a clickable advertisement will link users 16 to a predetermined URL (e.g., the Wal-Mart homepage).

As shown in FIG. 2B, if the published content is a tweet T1 regarding Wal-Mart W1, the ad branding engine 26 may embed a Wal-Mart logo L1 in the background area of the tweet T1. Similarly, the ad branding engine 26 may embed a McDonald's logo L2 in the background area of a tweet T2 regarding McDonald's M1. The logos L1 and L2 may be clickable hyperlinks. As shown in FIGS. 2A and 2B, the ad branding engine 26 may also incorporate hyperlinks H1 and H2 into the content areas of the tweets T1 and T2, which users 16 may click to view details advertised by the hyperlinks H1 and H2. Similarly, the ad branding engine 26 may transform the terms "Walmart's" W1 and "McDonalds" M1 in the tweets T1 and T2 into hyperlinks that redirect users 16 to a predetermined URL (e.g., the Wal-Mart and McDonald's homepages). Hence, content within the actual tweets may be configured as advertisements.

Moreover, the ad branding engine 26 may configure the tweets T1 and T2 such that a pop-up advertisement is displayed if a user 16 hovers over the word "Walmart's" W1 or "McDonalds" M1 and/or hovers over the Wal-Mart or McDonald's logo L1 and L2. Of course, the ad branding engine 26 may employ any combination of advertising formats known to those of skill in the art. In some instances, for example, the ad branding engine 26 may simply create a hyperlink using one or more words (e.g., Walmart's W1 or McDonalds M1) in the user-generated content (T1 or T2) and not incorporate additional forms of advertising. For purposes of discussion, however, any form of advertising employed by the ad branding engine 26 is to be understood as "branding" the user content or creating a "branded user content area" associated with the user-generated content.

According to another implementation, the ad branding engine 26 is configured to brand a single tweet with different advertisements. Thus, if a user's tweet on TWITTER 18 is also posted on YAHOO! 18 (e.g., via YAHOO! Updates), the tweet posted on TWITTER 18 may be branded with a different advertisement than that same tweet that is posted on YAHOO! This may occur due to different advertising preferences specified by TWITTER and YAHOO!, which the ad branding engine 26 takes into account. This may also occur if TWITTER and YAHOO! are associated with separate ad branding engines 26, which may be controlled by different entities or the social networks 18 themselves.

Furthermore, the ad branding engine 26 may brand a single tweet differently based on particular users 16. For instance, if the ad branding engine 26 brands a certain tweet posted by a tweeter 16, the ad branding engine 26 may brand that same tweet with different advertisements when viewed by the tweeter's followers 16. This may occur if the ad branding engine 26 determines that the original advertisement is not agreeable with a certain follower's preferences or settings. This may also occur if the ad branding engine 26 determines that another advertisement would be more appropriate to display to a particular follower.

By way of example, if a user 16 posts a tweet including the term "hamburger," the ad branding engine 26 may brand that tweet with a McDonald's advertisement (e.g., if the user information available to the ad branding engine 26 indicates that the tweeter 16 likes McDonald's). If this same hamburger-branded tweet is displayed to one of the tweeter's followers 16, the ad branding engine 26 may brand the tweet with another ad such as a Burger King advertisement. This may occur if the ad branding engine 26 determines that the follower 16 does not like McDonald's or that Burger King is the follower's favorite restaurant. If a second follower 16 is viewing the same hamburger-tweet, the ad branding engine 26 may brand the tweet with an Arby's advertisement. In this case, although both followers view the same hamburger-tweet, a separate advertisement is displayed to each follower 16. In branding content, therefore, the ad branding engine 26 can take into account user information associated with the original publisher, as well as user information associated with other users 16 viewing the posted content.

As previously mentioned, users 16 receive compensation for publishing content that becomes "branded" by the ad branding engine 26. In one aspect, advertisers 20 (or any designated entity) may agree to compensate users 16 of a social network 18 according to a tier-based system. Using TWITTER as an example, users 16 may be compensated in a first tier for each tweet that is branded by the ad branding engine 26. In a second tier, users 16 may receive compensation for each "impression," i.e., each time the branded tweet is actually displayed to or viewed by another unique user 16. Thus, TWITTER users 16 may earn compensation each time their followers 16 view their branded tweet.

In a third tier, a TWITTER user 16 may receive compensation if other unique users 16 "retweet" their branded tweet. In such cases, both the original tweeter and all subsequent retweeters may receive compensation, which may be divided between the users 16 proportionately. In a fourth tier, users 16 may receive compensation if other users 16 click on a hyperlink or pop-up that is included in the branded message. In a fifth tier, advertisers 20 may agree to compensate users 16 for each branded tweet that leads to a "conversion" (i.e., when a specified action associated with the advertisement occurs).

It is to be understood that the foregoing examples are merely provided for purposes of illustration, as additional tiers and alternative methods of compensations may be implemented. Moreover, the foregoing examples should not be construed as being limited to the TWITTER network 18, as the principles of the present application may apply to various social networks 18 known in the art. By way of example, advertisers 20 may compensate users 16 of the FACEBOOK network 18 each time a user's status message is branded by the ad branding engine 26. In a second tier, a FACEBOOK user 16 may be compensated each time the branded status message is displayed to or viewed by other unique users 16. In a third tier, a FACEBOOK user 16 may be compensated each time other unique users 16 "comment" on the branded status message. And so on.

Furthermore, advertisers 20 may agree to compensate users 16 for branded content that is published on multiple social networks 18. For instance, if a user 16 posts a comment on the FACEBOOK network 18 that becomes branded by the ad branding engine 26, the user 16 may receive additional compensation for posting (tweeting) the same message on the TWITTER network 20. Similarly, the user 16 may receive compensation if this same message is also published on the YAHOO! network 18 (e.g., by way of the YAHOO! Updates feature). In such instances where a user's branded content is published on more than one social network 18, the amount of compensation received may be modified or limited.

Of course, advertisers 20 may impose certain rules to prevent against fraud. For instance, advertisers 20 may set limits as to how much user-generated content may be branded per day. Moreover, advertisers 20 may only agree to compensate users 16 that have equal to or more than a predetermined number of connections (e.g., FACEBOOK friends, TWITTER followers, etc.) in their individual network. Advertisers 20 may also set caps as to how many impressions, clicks, and/or conversions a particular user 16 may be compensated for. Those of ordinary skill in the art will appreciate that advertisers 20 may impose various other conditions regarding compensation. Similarly, advertisers 20 may employ any now known or later developed fraud prevention algorithms and techniques.

Figure 3:
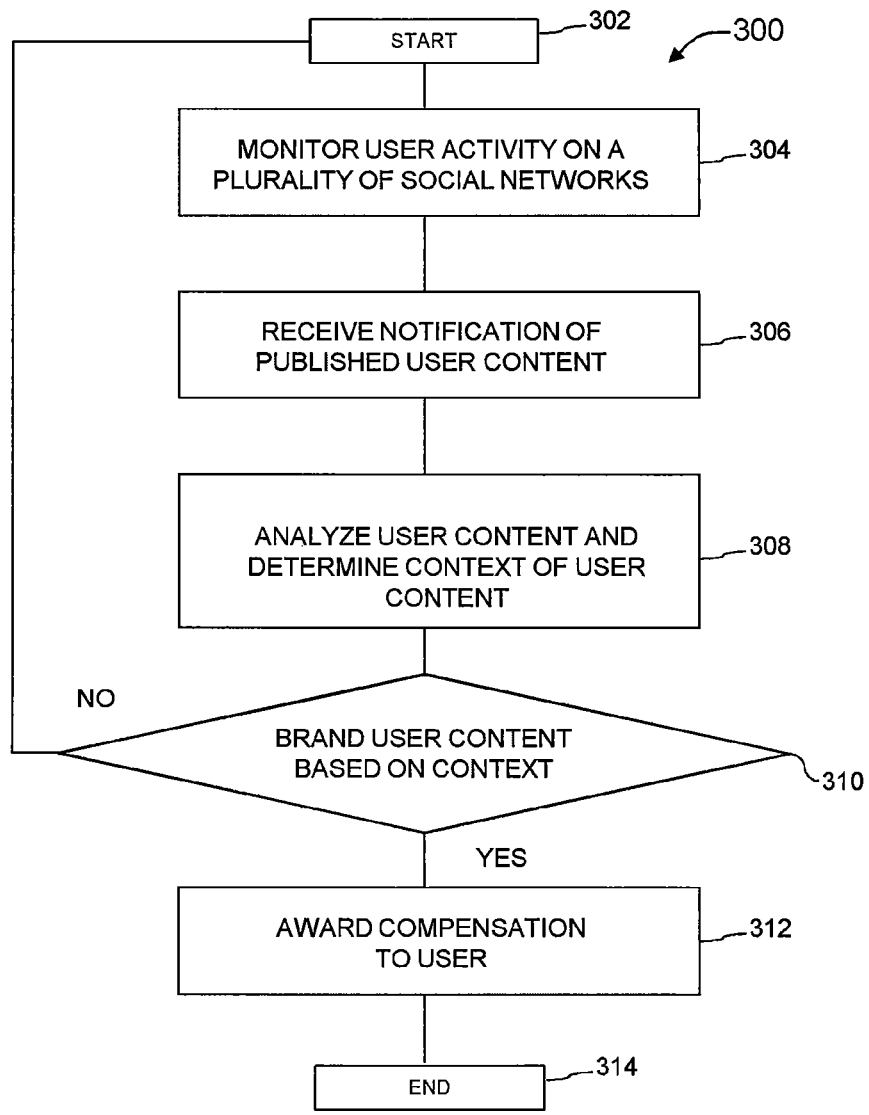
FIG. 3 is a flowchart illustrating a method for monetizing user-generated web content web content.

Referring now to FIG. 3, a method 300 for dynamically monetizing user-generated web content starts in block 302. In block 304, user activity taking place on a plurality of social networks 20 is monitored. In block 306, notification is received if a user 16 publishes content on at least one social network 18 being monitored. The user-published content is analyzed in order to determine the context of the content, as shown in block 308. If the context of the user content is appropriate for advertising, the user content is branded in step 310. If not, the method stops and returns to block 302. In block 312, the user 16 is compensated in response to the user's content being branded. The method ends at block 314.

Figure 4:
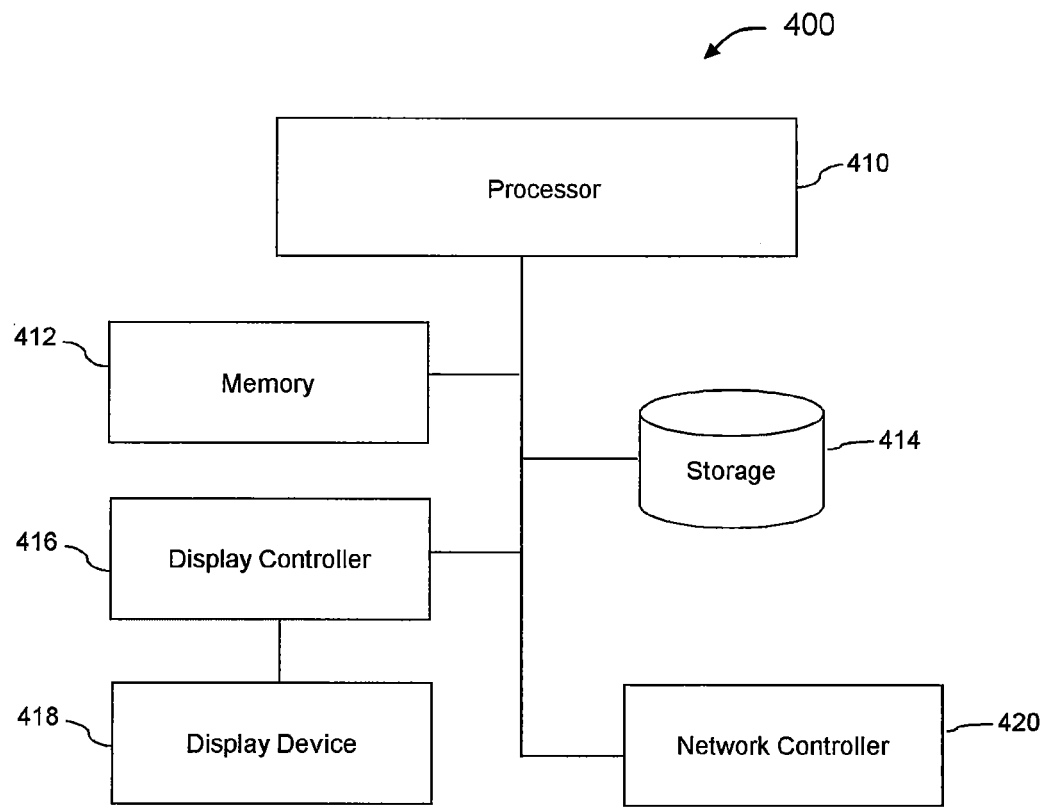
FIG. 4 is a schematic view of a computer system for implementing the methods described.

Any of the modules, servers, or engines described may be implemented in one or more computer systems. One exemplary system is provided in FIG. 4. The computer system 400 includes a processor 410 for executing instructions such as those described in the methods discussed above. The instructions may be stored in a computer readable medium such as memory 412 or storage devices 414, for example a disk drive, CD, or DVD. The computer may include a display controller 416 responsive to instructions to generate a textual or graphical display on a display device 418, for example a computer monitor. In addition, the processor 410 may communicate with a network controller 420 to communicate data or instructions to other systems, for example other general computer systems. The network controller 420 may communicate over Ethernet or other known protocols to distribute processing or provide remote access to information over a variety of network topologies, including local area networks, wide area networks, the Internet, or other commonly used network topologies.

In another embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this application. This description is not intended to limit the scope or application of this application in that the system 10 is susceptible to modification, variation and change, without departing from spirit of this application, as defined in the following claims. Furthermore, it should also be understood that the present application is not limited to a particular website or collection of websites, although many of the examples show examples associated with the TWITTER website.

I claim:

1. A system for dynamically monetizing user-generated web content, the system comprising:
   a tracking engine in communication with a plurality of social networks, the tracking engine being operable to detect user activity on the plurality of social networks;
   an analyzing engine in communication with the tracking engine and operable to receive notification therefrom that a first user has published user content in a user content area on at least one social network selected from the plurality of social networks, the analyzing engine being configured to determine the context of the user content;
   an ad branding engine in communication with the analyzing engine and operable to brand the user content area to generate a branded user content area incorporated with the user content area, the branded user content area being generated based on the context of the user content;
   wherein the first user earns compensation in response to the branded user content area being incorporated with the user content area.

2. The system of claim 1, wherein the branded user content area includes at least one advertisement selected by the ad branding engine, the at least one advertisement being selected from an advertisement database communicatively linked to the ad branding engine.

3. The system of claim 2, wherein the at least one advertisement is based on information associated with the first user.

4. The system of claim 3, wherein the first user earns additional compensation if a second user interacts with the at least one advertisement in a predetermined manner.

5. The system of claim 2, wherein the at least one advertisement includes a first advertisement and a second advertisement, the first advertisement being different than the second advertisement, and
   wherein the first advertisement is based on information associated with the first user, and the second advertisement is based on information associated with a second user.

6. The system of claim 5, wherein the first advertisement is displayed to the first user but not the second user, and the second advertisement is displayed to the second user but not the first user.

7. The system of claim 1, wherein the first user earns additional compensation if the user content generates additional user content, the additional user content being published on the at least one social network by at least a second user.

8. A method for dynamically monetizing user-generated web content, the method comprising:
   detecting user activity on a plurality of social networks;
   receiving notification that a first user has published user content in a user content area on at least one social network selected from the plurality of social networks;
   analyzing the user content to determine the context of the user content; and
   branding the user content area to generate a branded user content area incorporated with the user content area, the branded user content area being generated based on the context of the user content;
   wherein the first user earns compensation in response to the branded user content area being incorporated with the user content area.

9. The method of claim 8, wherein the branded user content area includes at least one advertisement selected from an advertisement database.

10. The method of claim 9, wherein the at least one advertisement is based on information associated with the first user.

11. The method of claim 10, wherein the first user earns additional compensation if a second user interacts with the at least one advertisement in a predetermined manner.

12. The method of claim 9, wherein the at least one advertisement includes a first advertisement and a second advertisement, the first advertisement being different than the second advertisement, and
   wherein the first advertisement is based on information associated with the first user, and the second advertisement is based on information associated with a second user.

13. The method of claim 12, wherein the first advertisement is displayed to the first user but not the second user, and the second advertisement is displayed to the second user but not the first user.

14. The method of claim 8, wherein the first user earns additional compensation if the user content generates additional user content, the additional user content being published on the at least one social network by at least a second user.

15. In a computer readable storage medium having stored therein instructions executable by a programmed processor for dynamically monetizing web content, the storage medium comprising instructions for:
   detecting user activity on a plurality of social networks;
   receiving notification that a first user has published user content in a user content area on at least one social network selected from the plurality of social networks;
   analyzing the user content to determine the context of the user content; and
   branding the user content area to generate a branded user content area incorporated with the user content area, the branded user content area being generated based on the context of the user content;

wherein the first user earns compensation in response to the branded user content area being incorporated with the user content area.

16. The computer readable storage medium of claim 15, wherein the branded user content area includes at least one advertisement selected from an advertisement database.

17. The computer readable storage medium of claim 16, wherein the at least one advertisement is based on information associated with the first user.

18. The computer readable storage medium of claim 17, wherein the first user earns additional compensation if a second user interacts with the at least one advertisement in a predetermined manner.

19. The computer readable storage medium of claim 18, wherein the at least one advertisement includes a first advertisement and a second advertisement, the first advertisement being different than the second advertisement, and
   wherein the first advertisement is based on information associated with the first user, and the second advertisement is based on information associated with a second user.

20. The computer readable storage medium of 19, wherein the first advertisement is displayed to the first user but not the second user, and the second advertisement is displayed to the second user but not the first user.

21. The computer readable storage medium of claim 15, wherein the first user earns additional compensation if the user content generates additional user content, the additional user content being published on the at least one social network by at least a second user.

* * * * *